United States Patent [19]
Tsubota et al.

[11] Patent Number: 5,616,852
[45] Date of Patent: Apr. 1, 1997

[54] METHOD AND APPARATUS FOR MEASURING FABRIC STRESS

[75] Inventors: Haruji Tsubota; Naoya Sasaki, both of Tokyo, Japan

[73] Assignee: Kajima Corporation, Tokyo, Japan

[21] Appl. No.: 601,383

[22] Filed: Feb. 14, 1996

Related U.S. Application Data

[63] Continuation of Ser. No. 388,344, Feb. 14, 1995, abandoned, which is a continuation-in-part of Ser. No. 40,128, Mar. 30, 1993, abandoned.

[51] Int. Cl.$^6$ ........................................................ G01L 5/04
[52] U.S. Cl. ................................. 73/37; 73/159; 73/786; 73/837
[58] Field of Search ............................ 73/37, 37.7, 159, 73/862.454, 760, 763, 837, 808, 786

[56] References Cited

U.S. PATENT DOCUMENTS

| | | | |
|---|---|---|---|
| 2,453,338 | 11/1948 | Pajak | 73/37 |
| 2,694,924 | 11/1954 | Matlock et al. | 73/37 |
| 3,677,076 | 7/1972 | Herzhoff et al. | 73/862.454 |
| 3,718,037 | 2/1973 | Stringer et al. | 73/37 |
| 3,724,266 | 4/1973 | Beckstrom | 73/808 |
| 4,910,997 | 3/1990 | Cook | 73/37 |

*Primary Examiner*—Hezron E. Williams
*Assistant Examiner*—Nashmiya Ashraf
*Attorney, Agent, or Firm*—James H. Tilberry

[57] ABSTRACT

A device for measuring woven fabric stress. The device includes a vacuum chamber having high rigidity; a vacuum pump for reducing the pressure in the vacuum chamber; a pressure gauge; a fabric displacement measuring device; and a fabric stress calculator. The vacuum chamber has an opening for sealing engagement with a surface of a fabric under atmospheric pressure. Upon evacuating the air from the vacuum chamber, the atmospheric pressure against the opposite surface of the fabric distends a portion of the fabric into the vacuum chamber. The measure of fabric distension and the reduced pressure reading in the vacuum chamber are transmitted to the fabric stress calculator, which compares the readings to compute a fabric stress reading.

9 Claims, 1 Drawing Sheet

METHOD AND APPARATUS FOR MEASURING FABRIC STRESS

This is a continuation of application Ser. No. 08/388,344, filed Feb. 14, 1995, now abandoned, which was in turn a continuation-in-part of abandoned application Ser. No. 08/040,128, filed Mar. 30, 1993.

BACKGROUND OF THE INVENTION

1. Field of the Invention

The field of invention relates to means for measuring stress in the warp and woof of a woven fabric. As used hereinafter, "fabric" shall mean a woven fabric of warp and woof; "warp" is defined to mean the lengthwise threads of a woven fabric; and "woof" is defined to mean the crosswise threads of a woven fabric.

2. Description of the Prior Art

In recent years, heavy duty woven fabrics have been used as roofs for gymnasia, indoor tennis courts, indoor playgrounds, indoor ice skating rinks, pavilions, athletic stadia, enclosures for outdoor concerts, and the like. These building construction heavy-duty woven fabrics as a whole are secured to supporting building structures so as to sustain heavy snow and wind loads by maintaining the warp and woof of the fabric in appropriate stress conditions. Fabric roofs generally fall into two classes: (1) fabric roofs internally supported by air pressure; and (2) fabric roofs held in place primarily by tension stressing of the fabric. In both types of fabric structures, it is extremely important structurally to properly maintain the tension on the fabrics to prevent flapping and pounding, which will occur under certain wind conditions if the fabric becomes slack due to lessening or loss of tension.

However, until now, in the actual installation of fabric roofs, there has been no practical means for determining whether the fabrics are tensioned in accordance with design specifications. As a consequence, re-tensioning has depended on the experience and judgment of skilled workers who engage in fabric roof construction. Furthermore, even though the fabric may be properly pre-tensioned when installed, the tension in the fabric gradually relaxes with time. Therefore, in order to safely maintain and to control the fabric structures, it is necessary to properly evaluate the relaxation of actual fabric tension and to reintroduce tension as required. However, since there have been no effective means for measuring fabric stress, when to re-tension has been a judgment call by those responsible for building maintenance.

SUMMARY OF THE INVENTION

A measuring system for stress according to the present invention comprises a vacuum chamber device with high rigidity, a device for reducing the pressure in the vacuum chamber, and a woven fabric displacement measuring device. The vacuum chamber device is composed of side walls and a top and is arranged such that the bottom edges of the side walls can be brought into contact with the surface of a fabric material. The pressure reducing device can reduce the pressure in the vacuum chamber device to a predetermined level and can maintain the reduced pressure for an adequate period of time. Because the underside of the fabric is exposed to atmospheric pressure, the fabric enclosed by the vacuum chamber device will be forced upwardly into the vacuum chamber, and means are provided to measure this displacement of fabric in the vacuum chamber.

The side walls and the top of the vacuum chamber device are preferably composed of a highly rigid material so as to maintain airtightness. The vacuum chamber device can be made of materials having predetermined rigidity and airtightness, such as thermoplastic, thermosetting or fiber reinforced plastic or the like, metals, and wood. However, in general, use is preferably made of lightweight and inexpensive materials having great strength. In any case, the vacuum chamber device is required to have sufficient rigidity so as not to collapse under reduced pressure, and it must sustain additional load in order to carry measuring instruments mounted on the vacuum chamber device.

Although the preferred embodiment of the invention shown in FIG. 1 of the drawings is elliptical in plan view, any other plan view configuration, such as, for example, a circular, polygonal, or irregular shape may be acceptable. Whatever the plan view configuration, the lower edge of the walls of the vacuum chamber device should make airtight contact with the top surface of the fabric material.

The shape of the bottom edge of the vacuum chamber device may be planar, or it may be curved to conform to the curvature of the fabric panel surface. In order to improve the seal between the vacuum chamber device and the top surface of the fabric panel, airtight packing may be secured to the bottom edges of the vacuum chamber device.

In the preferred embodiment of the invention, the measuring system for fabric stress is preferably a type displacement gauge, mounted on the underside of the top of the vacuum chamber device.

To draw a vacuum in the vacuum chamber device, normally use can be made of a rotary, piston, or diffusion pump.

There are no particular restrictions in the degree of pressure reduction by the pressure reducing device, since the degree of pressure reduction varies depending upon the strength of the fabric and the reduced pressure required for the measurement of the fabric stress. In general, the pressure reduction ranges approximately from 100 mmHg to 600 mmHg. The displacement caused by projecting a portion of the fabric material into the vacuum chamber toward the top of the chamber is the means for measuring the stress of the fabric.

The pressure reducing device can also be secured to the vacuum chamber device or it can be installed separate from the vacuum chamber device. In the former case, the measuring system for stress of the present invention can be made compact, but the unit becomes heavier. In the latter case, preferably the pressure reducing device and the vacuum chamber device are detachably connected together by means of a soft, lightweight and airtight hose.

The fabric displacement measurement device is connected to a fabric stress calculator which is calibrated to calculate fabric stress based on the measured displacement of the fabric. Although the preferable fabric displacement gauge is of the laser type, electromagnetic or sonic wave gauges can also be used.

The fabric stress calculator receives fabric surface displacement data from the fabric displacement gauge and then numerically converts the received data into the corresponding fabric stress by means of a microcomputer or the like. When the results of the relationship between the fabric stress and the fabric displacement are entered into the fabric stress calculator, the fabric stress at the time of measurement calculated from the above data is displayed on a printout sheet or other display means. Data required for the calculation of the fabric stress include a relationship between the load and elongation of a material, the degree of pressure reduction within the vacuum chamber, the area of the fabric enclosed by the vacuum chamber, and where on the enclosed fabric the displacement is measured (e.g., the distance of the fabric from the interior wall of the vacuum chamber, or the like. It is also preferable to consider some environmental conditions at the time of measurement, such as temperature and humidity.

The fabric displacement gauge is normally mounted on the inner surface of the top of the vacuum chamber body and the fabric stress calculator is secured to an outer portion of the vacuum chamber body. Both the fabric displacement gauge and the fabric stress calculator are appropriately electrically connected to each other.

The fabric displacements may be measured at one or more places on the fabric surface. However, in general, the accuracy in measurement can be raised by making a plurality of measurements on the fabric surface.

The influence of the configuration of the vacuum chamber on the stresses in the warp and woof directions upon displacement of the fabric surface at the time of pressure reduction can be negligible. When the configuration of the vacuum chamber is elliptical, the stresses in the warp and woof directions can be measured separately. Otherwise, the stresses in the vertical and horizontal directions of the fabric can be measured separately by providing an appropriate number of measuring points in the warp and/or woof directions of the fabric.

The measuring device for fabric stress of the present invention is particularly useful for fabric stress measurement in the various fabric-covered structures described above. Even in the case of other materials and applications, such as balloon fabrics, which are subject to similar stress conditions, the present invention can be successfully applied to measure fabric stress. Thus, quality control of fabric materials is possible regardless of the size, place, or installation of a particular fabric. Testing for, and measurement of, fabric stress is not limited to fabrics under atmospheric presssure, since the inventive device will function under more than or less than atmospheric pressure.

With the assistance of the present invention, fabric stress can be measured easily and accurately, and fabric prestress approximately equal to design stress can be obtained accurately at the time of installation of the fabric. Therefore, it is no longer necessary to depend solely on the skill and experience of the fabrication installers in order to prestress the fabric during installation. In addition, with the present invention, the fabric can be accurately stressed again when required due to normal relaxation under stress over a prolonged period of time. The ability to accurately re-stress fabric, made possible by the present invention, contributes to the safety and reliability of the structure as well as providing assurance the structure can be provided proper maintenance.

OBJECTS OF THE INVENTION

It is accordingly an object of the present invention to provide a fabric stress measuring device for use on various fabric structures.

It is another object of the present invention to provide a simple and effective fabric stress measuring device for determining fabric stress by measuring displacement of the fabric surface under a condition of reduced pressure.

It is yet another object of the invention to provide a fabric measuring device that is hand portable with respect to the fabric being tested.

BRIEF DESCRIPTION OF THE DRAWINGS

The foregoing and other objects and features of the invention will become apparent from the following description of a preferred embodiment of the invention with reference to the accompanying drawings, in which.

DETAILED DESCRIPTION OF THE PREFERRED EMBODIMENT

Figure 1:
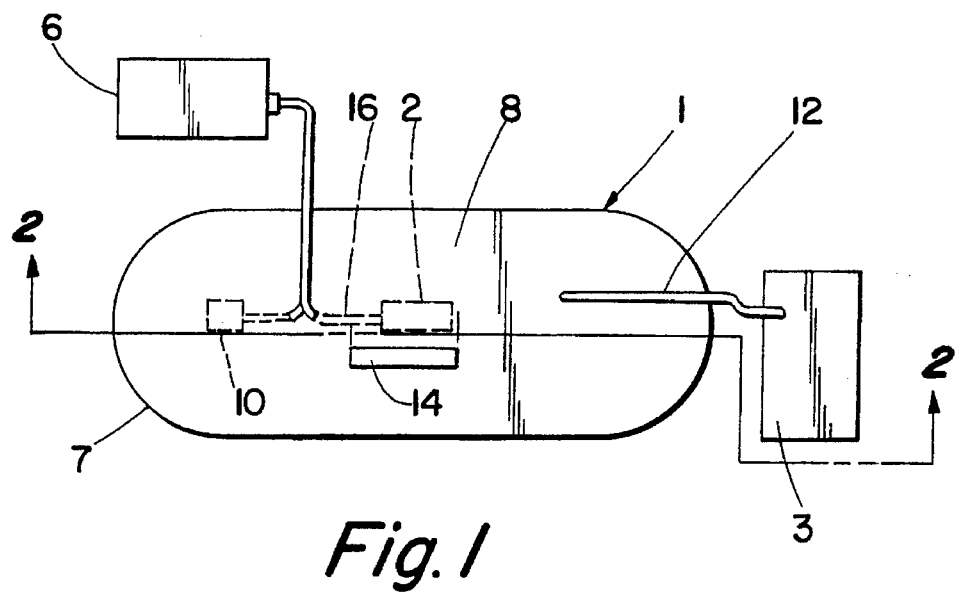
FIG. 1 is a top plan view of a preferred embodiment of the present invention.
Figure 2:
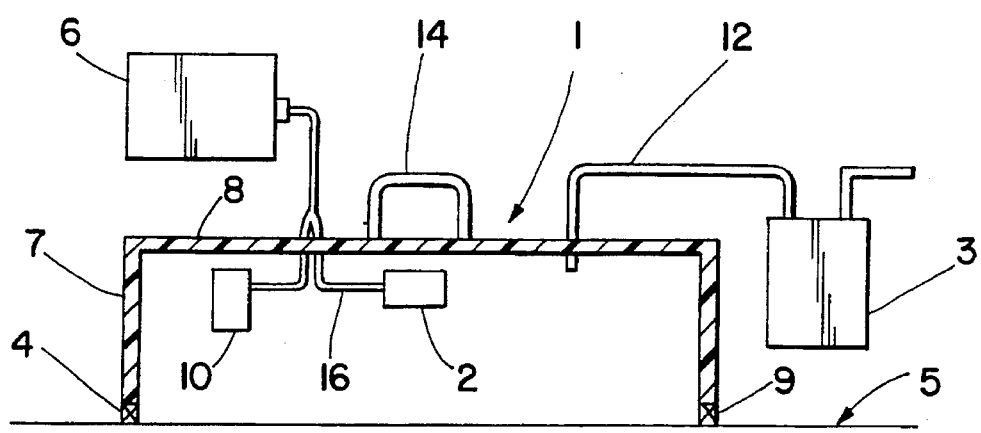
FIG. 2 is a front elevational view in section taken substantially along the line 2—2 of FIG. 1.

Referring now to FIGS. 1 and 2, a preferred embodiment of the present invention comprises a vacuum chamber 1 made of a transparent acrylic resin; a laser type displacement gauge 2; a vacuum pump 3; an air seal 4 secured to the bottom edge 9 of the vacuum chamber 1; a fabric stress calculator 6; and a pressure gauge 10. The vacuum chamber 1 includes sidewalls 7, a top portion 8, and a carrying handle 14. The interior of the vacuum chamber 1 is connected to the vacuum pump 3 through hose means 12, and the laser type displacement gauge 2 is connected to the fabric stress calculator 6 by electrical conduit means 16.

As best shown in FIG. 2, in use the present invention is placed so that the bottom edge 9 of the side wall 7 may be brought into sealing contact with the upper surface of the fabric material 5. The sealing material 4 compensates for gaps between the bottom edge 9 of the side wall 7 and the fabric material 5, so as to render the vacuum chamber 1 air tight.

Figure 4:
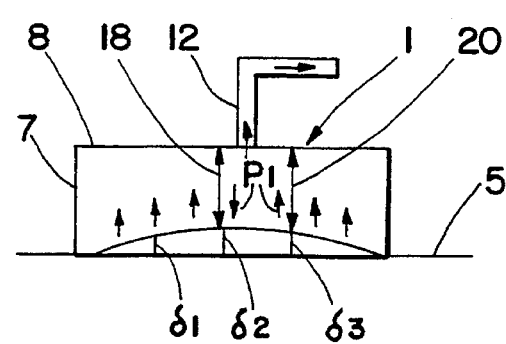
FIG. 4 is a schematic elevational view of the invention shown in FIG. 3, showing the displacement of the fabric after air has been evacuated from the vacuum chamber.

After the sealing material 4 and the fabric material 5 are brought into sealing contact with each other, actuation of the vacuum pump 3 reduces the pressure in the vacuum chamber 1. Simultaneously, the portion of the fabric 5 within the confines of the vacuum chamber 1 is drawn into the vacuum chamber 1, as shown in FIG. 4. After the pressure in the vacuum chamber 1 is sufficiently reduced, the laser type displacement gauge 2 is energized to measure the distance 18 between the high point of the displaced fabric 5 and the underside of top 8. This measurement is transmitted to the stress calculator 6, along with the internal pressure reading of the vacuum chamber 1 transmitted by pressure gauge 10. The stress calculator 6 is programmed to provide a fabric stress reading based on a comparison of the fabric displacement measurement 18 and the pressure of the vacuum chamber at the moment the displacement measurement is made. Fabric displacement readings may also be taken at other positions of the fabric, such as at 20, to provide a more comprehensive stress evaluation. Also, with the elliptical configured vacuum chamber of FIG. 1, it is possible to calculate the stress on both the warp and the woof of the fabric. Thus, assuming that the warp runs parallel to the longitudinal axis of the vacuum chamber 1, FIG. 1, the stress on the warp can be calculated. By shifting the vacuum chamber 90°, the stress on the woof can be calculated.

Figure 3:
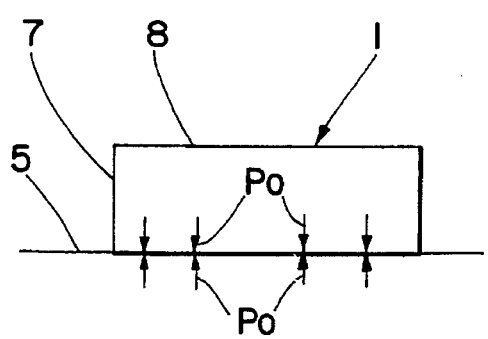
FIG. 3 is a schematic elevational view of the invention showing the position of a fabric to be tested prior to evacuating air from the vacuum chamber device.

The symbols $P_0$ in FIG. 3 indicate counter balancing atmosphering pressures, before the air in the vacuum chamber is evacuated. The symbol $P_1$ indicates pressure that is less than atmospheric, wherein the pressure difference between the interior and exterior of the vacuum chamber is $P_0-P_1$, thereby accounting for the displacements $\delta_1$, $\delta_2$, and $\delta_3$ of the fabric 5, as shown in FIG. 4.

It will occur to those skilled in the art, upon reading the foregoing description of the preferred embodiments of the invention, taken in conjunction with a study of the drawings, that certain modifications may be made to the invention without departing from the intent or scope of the invention. It is intended, therefore, that the invention be construed and limited only by the appended claims.

What is claimed is:

1. The method of field testing stress in a stationary suspended woven fabric panel of a building structure, said woven fabric panel having a woof and a warp and upper and lower surfaces subjected to atmospheric pressure, comprising the steps of:

a. confining an air space over a selected small portion of said upper surface of said woven fabric;

b. creating a differential in air pressure between said upper and lower surfaces by evacuating air from said air space to cause distension of said woven fabric within said air space;

c. measuring said distension of the said woven fabric into said evacuated air space;

d. measuring the air pressure in the evacuated air space; and e. calculating from said measured distension and said measured air pressure the stress in said woven fabric.

2. In a device for field testing woven fabric stress in a stationary suspended woven fabric panel of a building structure in which said woven fabric panel has upper and lower surfaces, the improvement comprising: a hand-portable vacuum chamber for freely resting on said fabric upper surface, said vacuum chamber having an opening adapted to make airtight sealing engagement with a portion of said fabric upper surface when both said upper and lower fabric surfaces are under atmospheric pressure; means to evacuate air from said vacuum chamber sufficiently to cause distension of said fabric upper and lower surfaces into said vacuum chamber; means within said vacuum chamber and spaced from said fabric to measure said distension of said fabric; means within said vacuum chamber to measure the air pressure in said vacuum chamber during the said distension of said fabric; means to transmit the said measure of said fabric distension to a calculator; means to transmit the said measure of air pressure in said vacuum chamber to said calculator, said calculator being programmed to compare said measure of said fabric distension and said measure of said air pressure and to provide a reading of fabric stress, said fabric comprising warp and woof; and means to position said fabric stress measuring device on said fabric so as to measure fabric warp stress, wherein said vacuum chamber has a substantially horizontal longitudinal axis and a substantially horizontal transverse axis, and said longitudinal axis is aligned with the warp of said fabric.

3. In a device for field testing woven fabric stress in a stationary suspended woven fabric panel of a building structure in which said woven fabric panel has upper and lower surfaces, the improvement comprising: a hand-portable vacuum chamber for freely resting on said fabric upper surface, said vacuum chamber having an opening adapted to make airtight sealing engagement with a portion of said fabric upper surface when both said upper and lower fabric surfaces are under atmospheric pressure; means to evacuate air from said vacuum chamber sufficiently to cause distension of said fabric upper and lower surfaces into said vacuum chamber; means within said vacuum chamber and spaced from said fabric to measure said distension of said fabric; means within said vacuum chamber to measure the air pressure in said vacuum chamber during the said distension of said fabric; means to transmit the said measure of said fabric distension to a calculator; means to transmit the said measure of air pressure in said vacuum chamber to said calculator, said calculator being programmed to compare said measure of said fabric distension and said measure of said air pressure and to provide a reading of fabric stress, said fabric comprising warp and woof; and means to position said fabric stress measuring device on said fabric so as to measure fabric woof stress, wherein said vacuum chamber has a substantially horizontal longitudinal axis and a substantially horizontal transverse axis, and said longitudinal axis is aligned with the woof of said fabric.

4. The method of claim 1, wherein step (c) comprises measuring distension of said woof.

5. The method of claim 1, wherein step (c) comprises measuring distension of said warp.

6. The method of claim 1, wherein said confined air space over a selected small portion of said upper surface of said woven fabric has a substantially horizontal longitudinal axis, and said longitudinal axis is aligned with said woof.

7. The method of claim 6, wherein said confined air space over a selected small portion of said upper surface of said woven fabric is substantially horizontally elliptical.

8. The method of claim 1, wherein said confined air space over a selected small portion of said upper surface of said woven fabric has a substantially horizontal longitudinal axis, and said longitudinal axis is aligned with said warp.

9. The method of claim 8, wherein said confined air space over a selected small portion of said upper surface of said woven fabric is substantially horizontally elliptical.

* * * * *